(12) United States Patent
Mayer et al.

(10) Patent No.: US 9,681,650 B2
(45) Date of Patent: Jun. 20, 2017

(54) LONG-DISTANCE DELIVERY SYSTEM FOR FISHING DEVICES

(71) Applicant: MayQua, LLC, Colorado Springs, CO (US)

(72) Inventors: Robert R. Mayer, Colorado Springs, CO (US); James R. Mayer, Colorado Springs, CO (US)

(73) Assignees: Robert R. Mayer, Colorado Springs, CO (US); James R. Mayer, Colorado Springs, CO (US)

( * ) Notice: Subject to any disclaimer, the term of this patent is extended or adjusted under 35 U.S.C. 154(b) by 426 days.

(21) Appl. No.: 14/565,131

(22) Filed: Dec. 9, 2014

(65) Prior Publication Data

US 2015/0157001 A1    Jun. 11, 2015

Related U.S. Application Data

(60) Provisional application No. 61/914,150, filed on Dec. 10, 2013.

(51) Int. Cl.
| | |
|---|---|
| *A01K 69/00* | (2006.01) |
| *A01K 91/02* | (2006.01) |
| *F41B 5/14* | (2006.01) |
| *A01K 91/06* | (2006.01) |
| *F42B 6/02* | (2006.01) |

(52) U.S. Cl.
CPC .............. *A01K 91/02* (2013.01); *A01K 91/06* (2013.01); *F41B 5/1484* (2013.01); *F42B 6/02* (2013.01)

(58) Field of Classification Search
USPC ............................ 43/4.5, 19, 44.98; 242/323
See application file for complete search history.

(56) References Cited

U.S. PATENT DOCUMENTS

| | | | | | |
|---|---|---|---|---|---|
| 3,084,467 | A | * | 4/1963 | Bromwell ............... | A01K 91/02 124/23.1 |
| 3,780,720 | A | * | 12/1973 | Alderson ............... | A01K 81/00 124/31 |
| 3,949,730 | A | * | 4/1976 | Schoenberger ....... | F41B 5/1488 124/23.1 |
| 4,648,194 | A | * | 3/1987 | Carroll, Jr. ............. | A01K 91/02 43/19 |
| 5,060,413 | A | * | 10/1991 | Garcia ................... | F41A 19/35 43/19 |
| 5,553,413 | A | * | 9/1996 | Gannon ................. | A01K 81/04 43/6 |
| 6,055,764 | A | * | 5/2000 | Armanno, Sr. ........ | A01K 91/02 43/19 |

(Continued)

*Primary Examiner* — Christopher P Ellis
(74) *Attorney, Agent, or Firm* — James A. Sheridan; Sheridan Law, LLC

(57) ABSTRACT

The disclosure provides a system and methods of use pertaining to long-range fishing applications. One embodiment provides a long-range fishing-device delivery system that relies on a mounting shaft, a buoyancy module, and a fishing or payload module to house a variety of fishing devices such as a baited hook, an artificial lure, or a fishing accessory such as a depth sensor, temperature sensor, or fish finder. The delivery system leverages a launch force from an external launching apparatus such as a bow or slingshot to deploy the system and enclosed fishing device to a desired long-range location and depth within a body of water. Other embodiments are also disclosed.

18 Claims, 9 Drawing Sheets

(56) References Cited

U.S. PATENT DOCUMENTS

| | | |
|---|---|---|
| 6,094,853 A | 8/2000 | Lim |
| 7,055,280 B2 | 6/2006 | Shen et al. |
| 7,698,851 B1 * | 4/2010 | Donohoe ............... A01K 91/02 43/19 |
| 9,383,160 B1 * | 7/2016 | White ................... F41B 5/1488 |
| D779,031 S * | 2/2017 | von Mohr .................... D22/137 |
| 2006/0059764 A1 | 3/2006 | Triano et al. |
| 2011/0283593 A1 | 11/2011 | Parkinson, III |

* cited by examiner

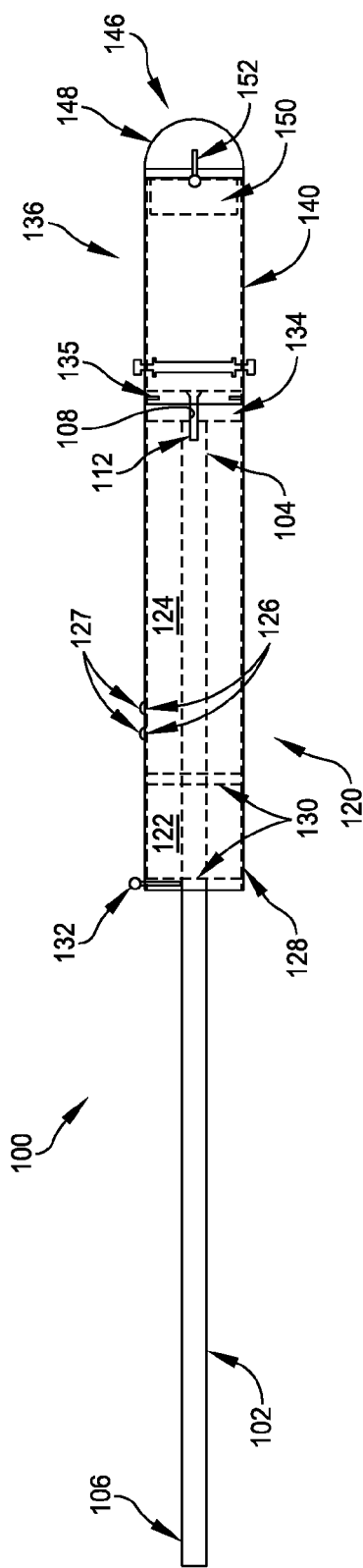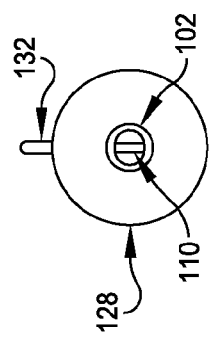

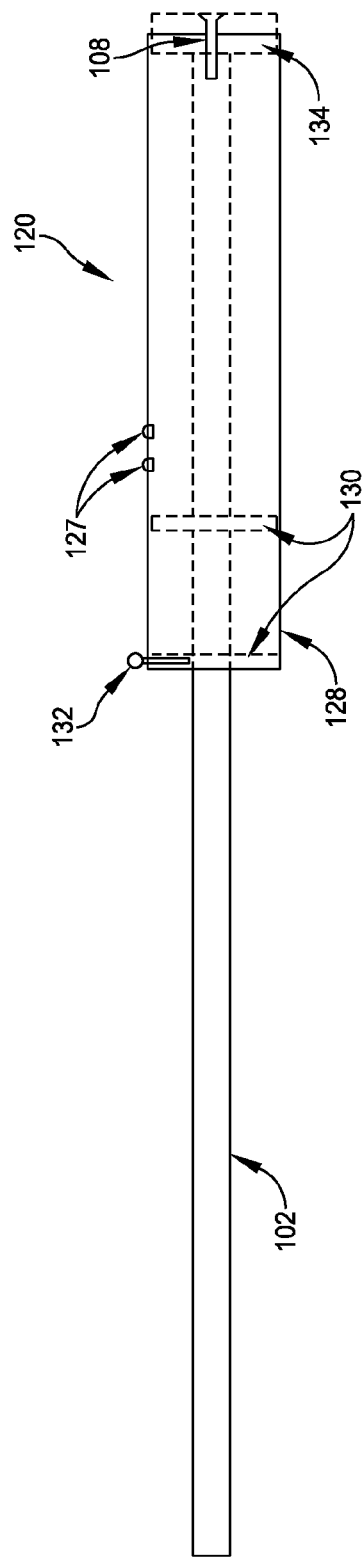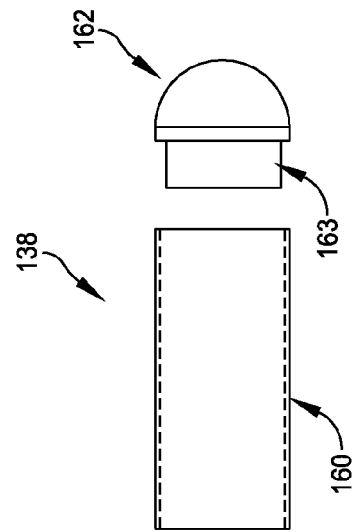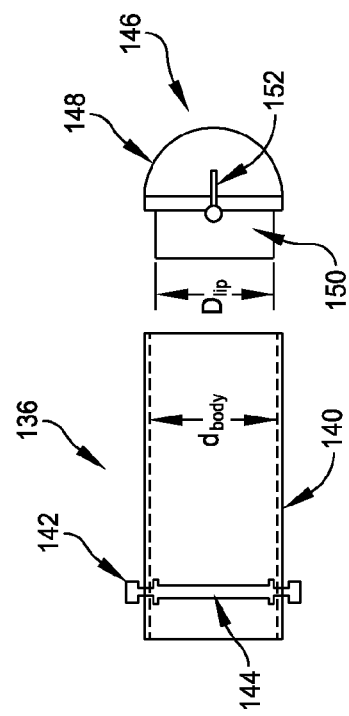

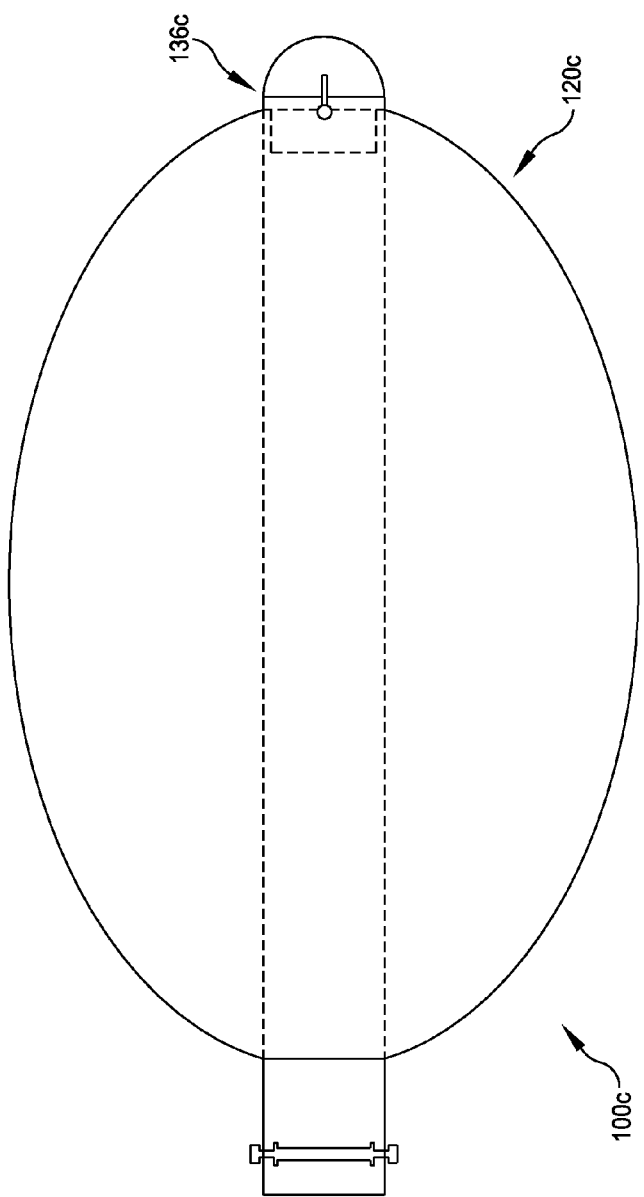

LONG-DISTANCE DELIVERY SYSTEM FOR FISHING DEVICES

REFERENCE TO PENDING PRIOR PATENT APPLICATION

This application claims the benefit under 35 U.S.C. 119 (e) of U.S. Provisional Patent Application No. 61/914,150, filed Dec. 10, 2013 by Robert R. Mayer and James R. Mayer for "LONG DISTANCE BAIT DELIVERY SYSTEM FOR FISHING," which patent application is hereby incorporated herein by reference.

BACKGROUND

Traditionally, anglers use a flexible fishing rod and accompanying fishing line and reel to manually cast a baited hook (e.g., baited with night crawlers, insects, small bait fish) or an artificial lure to a spot in the water in an attempt to attract and catch fish. Such fishing rods have limited reach and travel, and the distance a fishing hook may be delivered into the water is limited by a combination of the rod length, rod material, and the length of fishing line stowed on the reel. These rod-based methods work well for relatively nearby locations, but they are limited by the distance that the baited hook or artificial lure can be cast, even with modern rod materials such as graphite.

Distance limitations have a significant impact on fishing outcomes because delivering the right bait or lure to the right spot is the key to success in fishing. A longer cast would allow anglers to reach locations otherwise inaccessible from shore, reach deeper waters farther from shore without the need for a boat, avoid currents that move the cast baited hook or artificial lure to undesired locations, and reach locations farther from a boat that emits distracting sounds, including waves against the boat's hull, that may drive fish away.

Beyond an inability to cast a baited hook or artificial lure at long range, existing rod-based fishing mechanisms don't allow for a great deal of flexibility with respect to buoyancy control. While some artificial lures include a minimal level of addable weight, they are neither sufficiently robust nor sophisticated to provide a truly adjustable buoyancy solution that can float on the water's surface, sink to the bottom of the water column, or float at any point in between.

In addition, current fishing methods don't allow for fishing devices other than a baited hook or artificial lure to be deployed at long range. Anglers use a variety of tools to enhance the fishing experience, including, for example, depth and temperature sensors, fish finders, and more. Currently these tools are only relevant at close range, which drastically reduces their usefulness in an environment where anglers are seeking ways to lengthen the physical reach of the sport.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

One embodiment provides a long-range fishing-device delivery system for use in connection with a launching apparatus and a fishing rod. The delivery system includes a mounting shaft having first and second ends. A rod-line attachment portion and a buoyancy module are affixed at the first end of the mounting shaft, and a carrier module is affixed to the buoyancy module. The second end of the mounting shaft is configured to receive a launch force from the launching apparatus, and the rod-line attachment portion retains a fishing line from the fishing rod.

Another embodiment provides a method of using a launching apparatus and a fishing rod having a reel of fishing line, or rod line, to deliver a fishing device to a desired long-range location. The method includes providing a long-range fishing-device delivery system having a mounting shaft with first and second ends, where the first end includes a rod-line attachment portion and a carrier module and the second end is configured to fit against a drawstring of the launching apparatus. The method also includes loading the carrier module with the fishing device, attaching the rod line to the rod-line attachment portion of the delivery system, and, using the launching apparatus, launching the delivery system toward the desired long-range location.

Yet another embodiment provides a throwable fishing-device delivery system having an oblong buoyancy chamber configured for long-range launch by a human hand and a carrier module embedded within the buoyancy chamber. The carrier module may comprise a fishing module or a payload module.

Other embodiments are also disclosed, and additional objects, advantages and novel features of the technology will be set forth in part in the following description, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which:

FIG. 1 illustrates a side plan view of one embodiment of a long-range fishing-device delivery system;

FIG. 2 illustrates an end view of the delivery system of FIG. 1;

FIG. 3 illustrates a side plan view of a mounting shaft and buoyancy module of the delivery system of FIG. 1;

FIG. 4 illustrates a side plan view of a fishing module of the delivery system of FIG. 1;

FIG. 5 illustrates a side plan view of a payload module of the delivery system of FIG. 1;

FIG. 15 illustrates a side plan view of one embodiment of a throwable long-range fishing-device delivery system; and FIG. 16 illustrates a side plan view of a payload module for use with the delivery system of FIG. 15.

DETAILED DESCRIPTION

Figure 6:
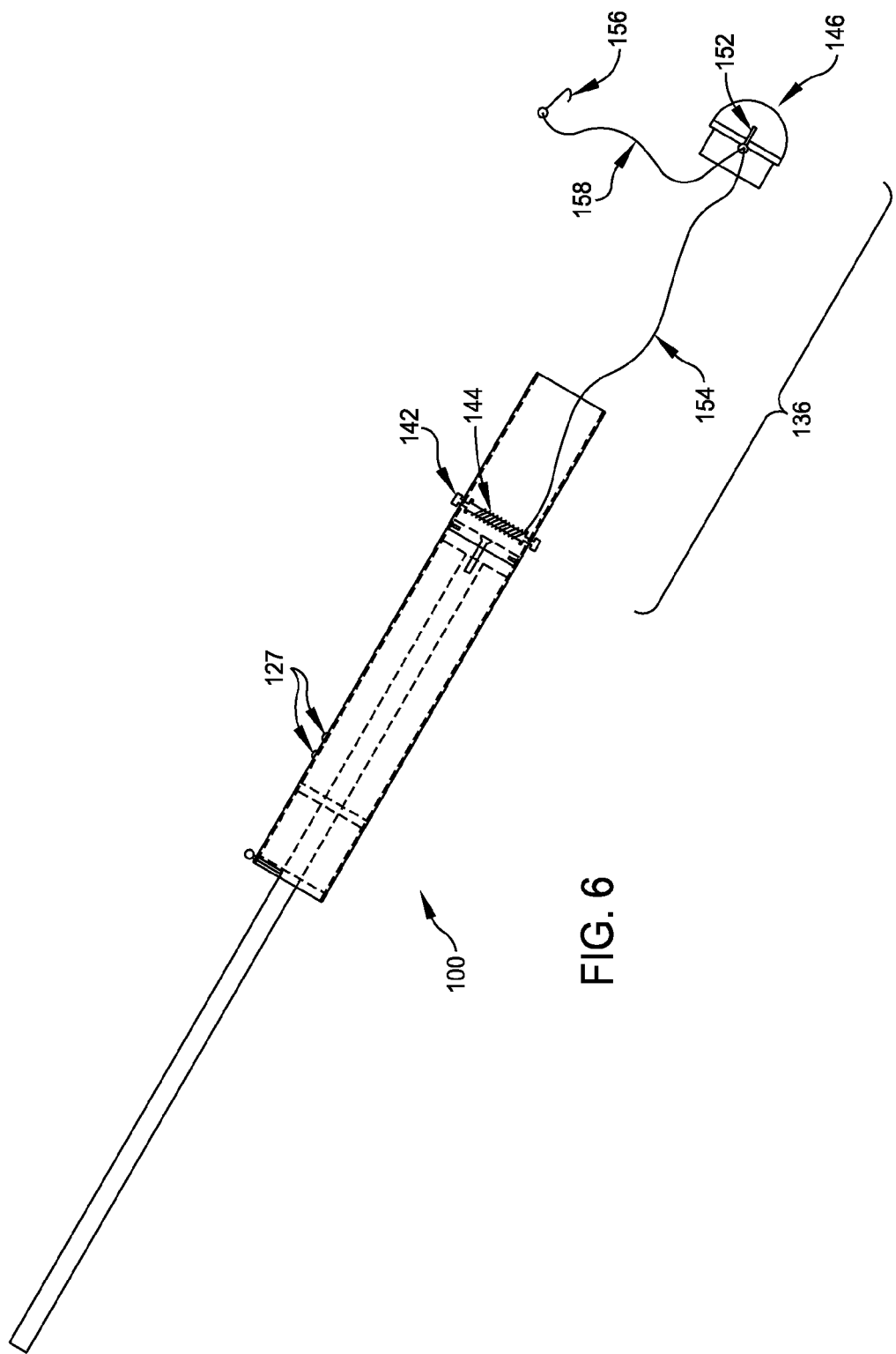
FIG. 6 illustrates a side plan view of the delivery system of FIG. 1 in a deployed position and depicting a first embodiment of a fishing line arrangement.

The long-range fishing-device delivery system described below provides a means to deploy a fishing device, such as a baited hook, artificial lure, and/or fishing accessory designed to affect and/or gather information regarding existing fishing conditions (e.g., a temperature sensor, depth sensor, fish finder, noise maker, etc.) to locations unreachable through traditional casting methods. The delivery system allows an angler to capture the fishing device, adjust the way the fishing device is ultimately presented upon landing in the water, set a desired deployed depth or buoyancy, and then deploy the system at long-range over a body of water. This combination of versatility in deployed fishing devices and sophistication in range and depth provide an enhanced fishing experience beyond any currently available to even the most avid anglers.

FIGS. 1-2 illustrate side plan and end views of one embodiment of a long-range fishing-device delivery system 100, respectively. Delivery system 100 includes a mounting shaft 102 having a first end 104 and a second end 106. First end 104 of mounting shaft 102 may include a threaded hole 108 for attaching one or more modules to first end 104, as discussed below. In various embodiments, the below-discussed modules may attach, directly or indirectly, to mounting shaft 102 or to each other via threaded hole 108 or via threaded end sections that allow the modules to threadably engage where they meet or intersect.

Second end 106 of mounting shaft 102 may include a slot or nock 110 (FIG. 2) that enables delivery system 100 to be leveraged against the drawstring of a launching apparatus such as, for example, a bowstring of a bow or a rubber pull of a slingshot or similar launching device, as discussed below in relation to FIG. 14. Mounting shaft 102 may have a size and length similar to an arrow without fletching and may be formed of any appropriate flexible material suitable for interaction with a launching apparatus. Such materials may include, for example, wood, aluminum, fiberglass, graphite, or carbon fiber.

In one embodiment, two separate modules may be mounted to first end 104 of mounting shaft 102. A buoyancy module 120, shown in FIGS. 1 and 3, may be attached via a fastener 112 mated with threaded hole 108. In this configuration, buoyancy module 120 may be used to provide a mechanism for controlling whether delivery system 100 will float on the surface of the water, descend to the bottom of the water column, or descend to a depth in between. Buoyancy module 120 may house a permanent buoyancy chamber 122 that lies adjacent to an adjustable buoyancy chamber 124.

Permanent buoyancy chamber 122 may include a sealed or permanent compartment that provides a predetermined and fixed amount of buoyancy, while adjustable buoyancy chamber 124 may include two sealable adjustment apertures 126. In one embodiment, adjustment apertures 126 may be either opened or sealed through the respective removal or placement of corresponding plugs 127 formed of rubber or any other appropriate material.

To achieve maximum buoyancy, adjustment apertures 126 may be filled with air and sealed, causing delivery system 100 to float on the surface of the water. To achieve minimum buoyancy, adjustment apertures 126 may be left open or unplugged such that adjustable buoyancy chamber 124 takes on water upon landing, causing delivery system 100 to sink to the bottom of the water column. A buoyancy that results in a desired depth between the water's bottom depth and top surface may be achieved by adding weight to adjustable buoyancy chamber 124 via adjustment apertures 126 before sealing adjustment apertures 126 prior to use. Added weight may take any appropriate form. For example, a user may use commercially available weights and/or blocks, rocks, sand, and/or water to add weight to adjustable buoyancy chamber 124.

Buoyancy module 120 may be formed of any appropriate material having any size, shape, type, and/or configuration. In one embodiment, buoyancy module 120 is formed by a structural tube 128 with a diameter of approximately one inch and two seal walls 130. Each seal wall 130 may be a disc having an outer diameter that matches the diameter of structural tube 128, with center clearance holes (not shown) for mounting shaft 102. Tube 128 and walls 130 may be formed of any rigid material including, for example, molded plastic, composite material, or light-weight metal such as aluminum.

A rod-line attachment portion 132 may protrude from buoyancy module 120 in a manner that allows for the attachment of a fishing line from a traditional fishing rod, as discussed below in relation to FIG. 14. Rod-line attachment portion 132 may be formed of any appropriate structural feature. As shown in FIGS. 1-3, one embodiment of rod-line attachment portion 132 may be formed from an eyelet that is attached (e.g., press fit, threaded into) one of seal walls 130.

A carrier module may abut the front of buoyancy module 120. In one embodiment shown in FIG. 1 and detailed in FIG. 4, the carrier module may be a fishing module 136 configured to house a baited hook or artificial fishing lure. In another embodiment shown in FIG. 5, the carrier module may be a payload module 138 configured to house a fishing accessory such as a fish-finder transducer, a noise maker, a movement sensor, a depth sensor, and/or a temperature sensor.

Notably, mounting shaft 102, buoyancy module 120, and fishing module 136 or payload module 138 may be connected via any appropriate means, including screws, glue, tape, nails or metal posts, and/or any other type of fasteners. Module joints may be achieved via a press fit, a twist-and-lock interface such as a bayonet mount, a threaded surface, or any other appropriate connection method.

While FIG. 1 details one embodiment of the attachment of fishing module 136 to buoyancy module 120, both fishing module 136 and payload module 138 (FIG. 5) may attach to buoyancy module 120 in a similar manner. In this embodiment, an attachment wall 134 may be used to attach buoyancy module 120 to either fishing module 136 or payload module 138. Focusing on fishing module 136, which is shown in FIG. 1, attachment wall 134 may have a thickness that is approximately twice that of support walls 130. Half of attachment wall 134 may retain the front of buoyancy module 120, while the other half may retain the rear of fishing module 136. For additional security, one or more threaded fasteners 135 of any appropriate size, shape, type, and/or configuration may be used to secure fishing module 136 to attachment wall 134. In another embodiment that doesn't require additional fasteners and/or an attachment wall, buoyancy module 120 and fishing module 136 may interconnect via mated threaded ends.

FIG. 4 shows a side plan view of one embodiment of fishing module 136. In this embodiment, fishing module 136 is formed from a hollow body 140, which may mirror structural tube 128 of buoyancy chamber 120 in size, shape, and/or material. Fishing module 136 also includes a nose-cone assembly 146, which features a nose cone 148, a detaching lip 150, and a fishing-line attachment portion 152, which may be an eyelet or any other appropriate retaining structure.

To cause fishing module 136 to open upon deployment, an outer diameter, $D_{lip}$, of detaching lip 150 may be sized such that lip 150 slides loosely within an inner diameter, $d_{body}$, of hollow body 140 in a manner that allows nose-cone assembly 146 to separate from hollow body 140 when delivery system 100 is launched. Nose cone 148 and hollow body 140 may be shaped as shown in FIG. 4 or they may be shaped to provide a more aerodynamic effect as delivery system 100 slips through the air and water with less drag.

Fishing module 136 may house a baited hook or artificial lure that is drawn out when fishing module 136 opens and delivery system 100 lands in the water. In this regard, a rotatable spool 142 may be installed across the inner diameter, $d_{body}$, of hollow body 140. Spool 142 may include a shoulder-bounded center section 144 upon which a length of fishing line may be wound. The ends of spool 142 may extend through openings (not shown) in hollow body 140, where nuts or other appropriate fasteners may loosely secure spool 142 to body 140.

Figure 7:
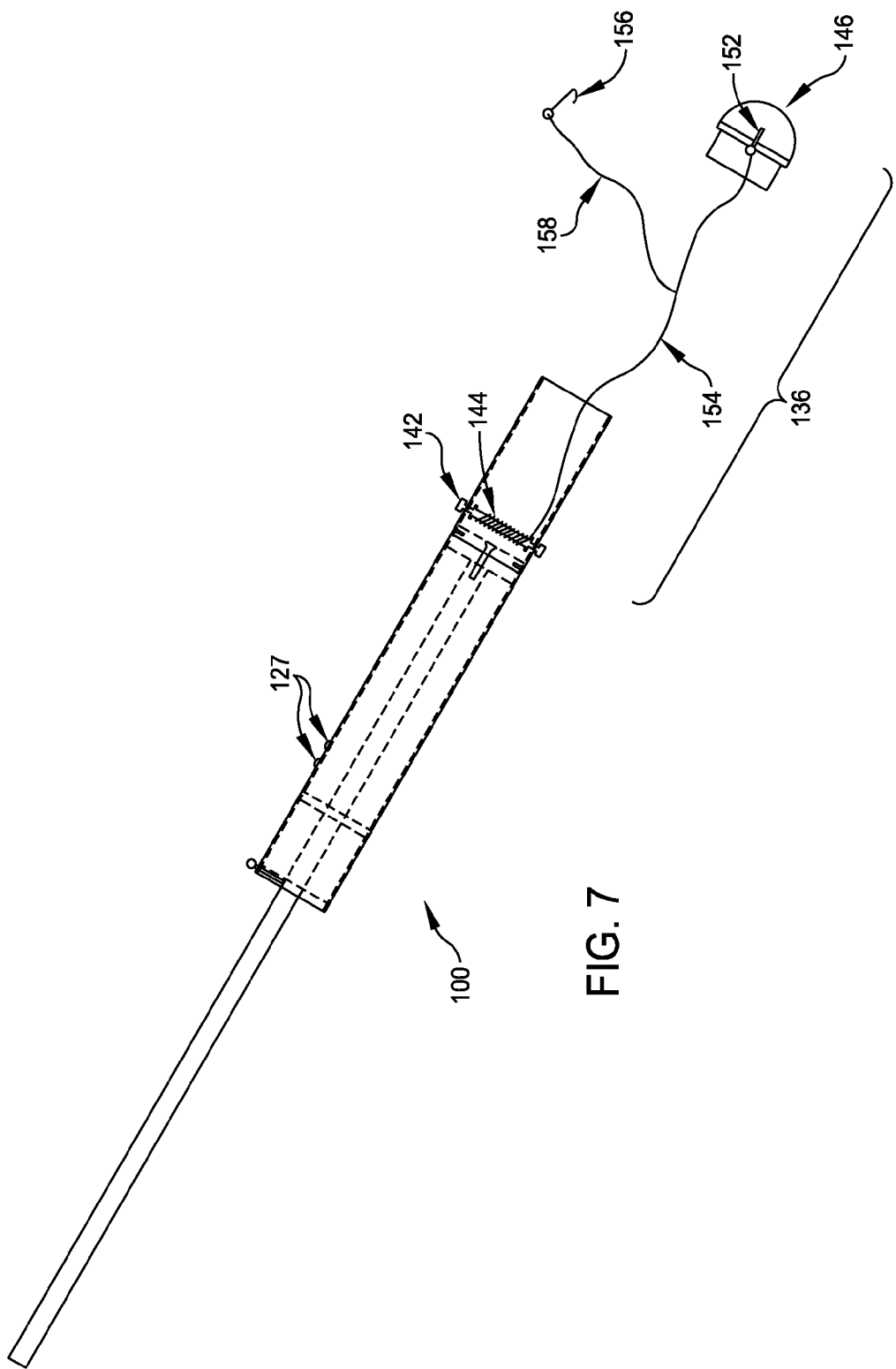
FIG. 7 illustrates a side plan view of the delivery system of FIG. 1 in a deployed position and depicting a second embodiment of a fishing line arrangement.

FIGS. 6-7 show two ways of attaching a baited hook or artificial lure (collectively a "hook") 156 between spool 142 and fishing-line attachment portion 152 in order to present hook 156 to fish. First, as shown in FIG. 6, an end of a first length of fishing line 154 may be secured to spool 142 and wound about center section 144. The opposite end of fishing line 154 may be secured (e.g., tied) to fishing-line attachment portion 152. A second length of fishing line 158 may also attach to fishing-line attachment portion 152 and retain hook 156, allowing hook 156 to float away from delivery system 100 in the natural flow of the water. In an alternate embodiment, shown in FIG. 7, second fishing line 158 may be attached directly to first fishing line 154, which further distances hook 156 from nose-cone assembly 146 once fishing module 136 separates.

In either embodiment shown in FIG. 6 or FIG. 7, hook 156 and second fishing line 158 may be pushed into hollow body 140 before launch or left outside fishing module 136 for deployment. If pushed inside hollow body 140, the structure of fishing module 136 serves to protect any delicate natural bait attached to hook 156 that would otherwise be damaged by the high travel speeds undergone upon launch. In addition, hollow body 140 may include any appropriate structures necessary to separate hook 156 from spool 142 when hook 156 and second fishing line 158 are stored therein. For example, a wall (not shown) may be inserted within hollow body 140 and include an aperture through which fishing line 154 may pass, thereby isolating second fishing line 158 and hook 156 and preventing them from becoming tangled around spool 142 during launch.

Because nose-cone assembly 146 may begin to separate from hollow body 140 in the air, buoyancy adjustment apertures 126 of adjustable buoyancy chamber 124, discussed above, may be strategically employed, i.e., left open, to create a vacuum within adjustable buoyancy chamber 124 and fishing module 136 to help hold nose-cone assembly 146 in place until delivery system 100 hits the water.

In one embodiment, nose-cone assembly 146 may incorporate a latch (not shown) configured to secure nose-cone assembly 146 to hollow body 140 of fishing module 136 prior to launch. Using a latch allows an angler to ready delivery system 100 for launch and then mechanically secure nose-cone assembly 146 to hollow body 140 to keep delivery system 100 in the same state until the time of launch. At that time, the angler may release the latch to allow fishing module 136 to operate normally, or to open when subjected to the forces of gravity and impact upon launch.

Returning to FIG. 5, payload module 138 may replace fishing module 136 on delivery system 100. FIG. 5 shows a side plan view of one embodiment of payload module 138. In this embodiment, payload module 138 is similar to fishing module 136 in that it features a hollow body 160 and nose-cone assembly 162. Payload module 138 differs from fishing module 136 in that it does not include features to accommodate a fishing line and/or hook, and its nose-cone assembly 162 does not detach from hollow body 160 upon launch. In this regard, nose-cone assembly 162 features a non-detaching lip 163. The fixed connection between non-detaching lip 163 and hollow body 160 may be achieved in any appropriate manner, including the use of fasteners, glue, a press fit, or an interlocking mounting method such as a bayonet mount. Due to the fixed connection between nose-cone assembly 162 and hollow body 160, payload module 138 remains closed upon launch and impact with the water. As a result, payload module 138 may serve to transport a variety of fishing accessories to a desired long-range location. Such accessories may include, for example, a fish-finder transducer, a noise maker, a movement sensor, a depth sensor, a temperature sensor, and/or any other accessory employed to enhance the fishing experience.

Embodiments of mounting shaft 102, buoyancy module 120, fishing module 136, and payload module 138 may feature any appropriate configuration or combination of configurations (e.g., lengths, diameters, material thicknesses, etc.) and material or combination of materials to accommodate various desired weights and/or strengths of delivery system 100. For example, a lighter weight, smaller system could be employed for fresh water fishing, while a stronger, more robust device could be used for salt water fishing where the fish are generally larger, heavier, and deeper. In addition, mounting shaft 102, buoyancy module 120, fishing module 136, and/or payload module 138 may be adapted as appropriate for airborne and/or submersed conditions. In this regard, any or all of these components may include aerodynamic and/or stability features such as streamlined profiles, added fins or fletching, and/or other suitable structures necessary to aid in the delivery and/or end use of system 100.

The modular design discussed above provides a great deal of design flexibility. For example, the carrier module (either fishing module 136 or payload module 138) as well as permanent buoyancy chamber 122 and adjustable buoyancy chamber 124 may be rearranged to tailor the system to different fishing scenarios. In this regard, FIGS. 8-9 detail an alternate embodiment of a long-range fishing device delivery system 100a. In this embodiment, a buoyancy module 120a has been shortened and includes only an adjustable buoyancy chamber 124a. The permanent buoyancy chamber (122 of FIG. 1) has been removed altogether. Mounting shaft 102 and buoyancy module 120a may attach to fishing module 136 and/or payload module 138 (FIG. 5) in the same manner discussed above in relation to delivery system 100.

Figure 8:
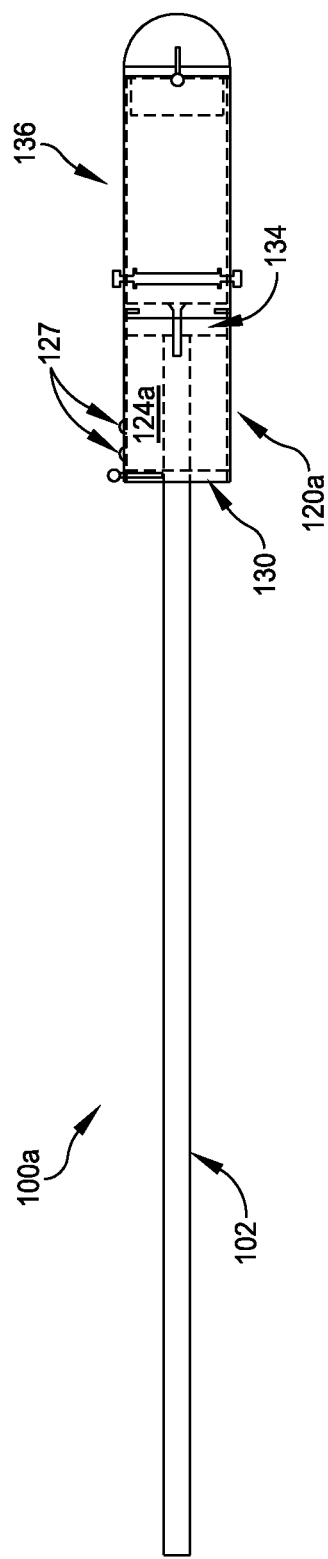
FIG. 8 illustrates a side plan view of another embodiment of a long-range fishing-device delivery system.
Figure 9:
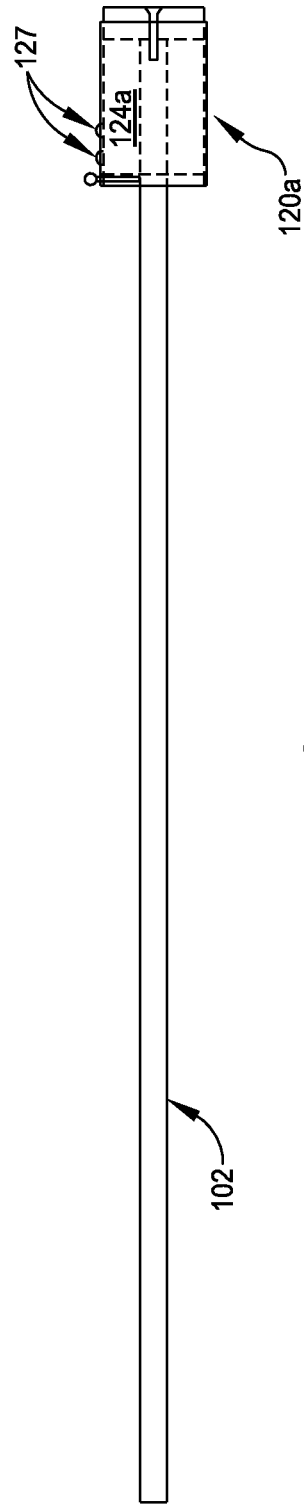
FIG. 9 illustrates a side plan view of a mounting shaft and buoyancy module of the delivery system of FIG. 8.
Figure 10:
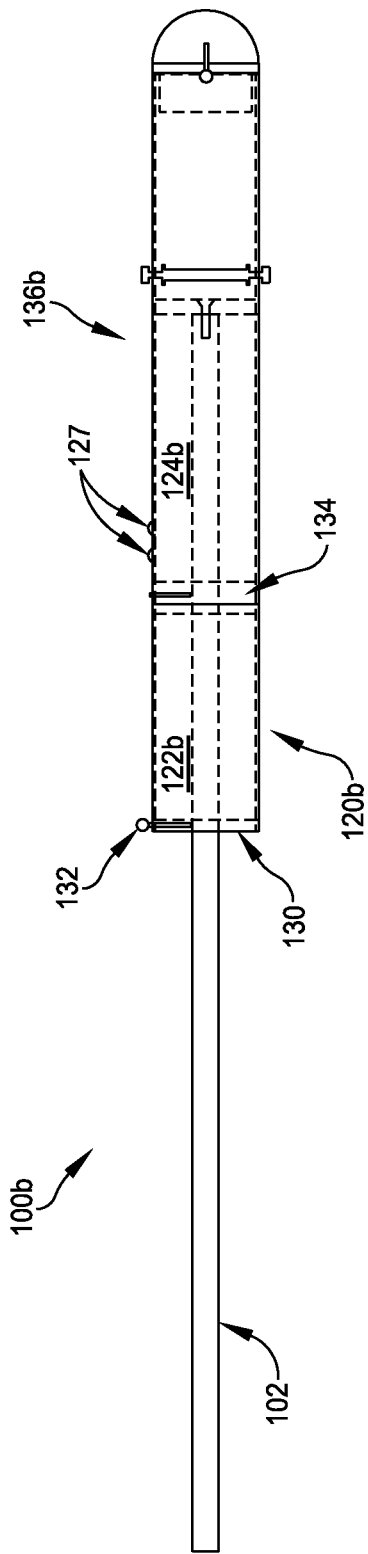
FIG. 10 illustrates a side plan view of yet another embodiment of a long-range fishing-device delivery system.
Figure 11:
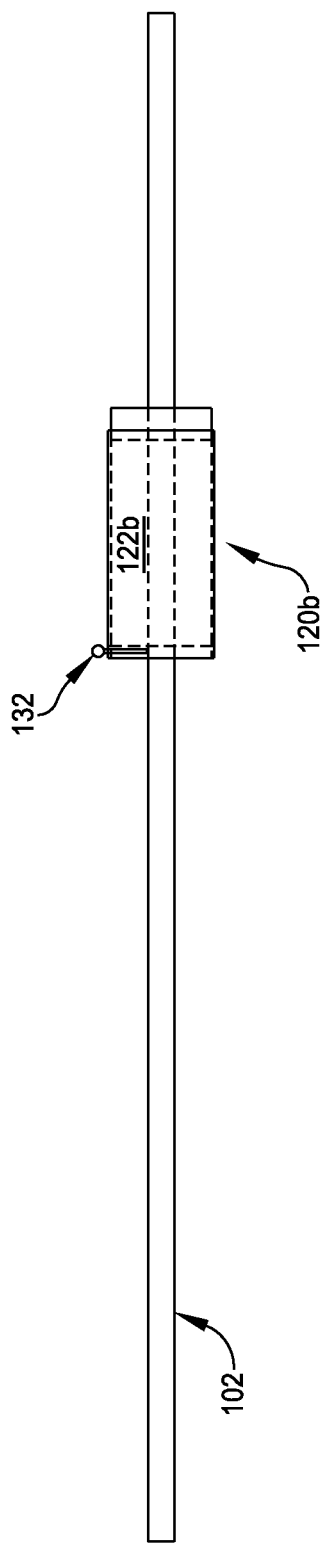
FIG. 11 illustrates a side plan view of a mounting shaft and buoyancy module of the delivery system of FIG. 10.
Figure 12:
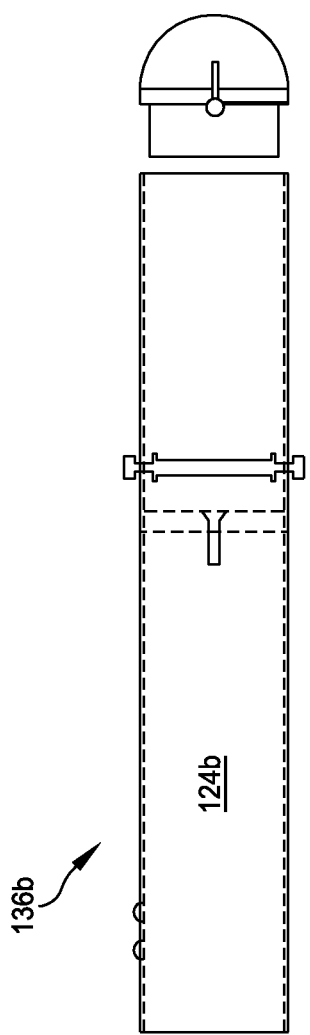
FIG. 12 illustrates a side plan view of a fishing module of the delivery system of FIG. 10.
Figure 13:
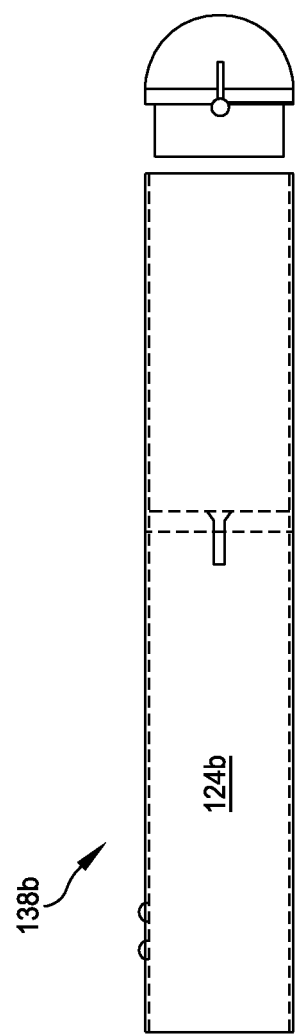
FIG. 13 illustrates a side plan view of a payload module of the delivery system of FIG. 10.

This alternate embodiment eliminates all permanent buoyancy features from system 100a, and as a result, the entire system floats or sinks according to a desired/adjusted buoyancy set by the user. While FIGS. 8-9 show buoyancy module 120a as having an adjustable buoyancy chamber, sealable adjustment apertures 126 could be removed such that another embodiment of the shortened buoyancy module 120a would include only a permanent buoyancy chamber 122a (not shown).

FIGS. 10-13 detail another embodiment of a long-range fishing-device delivery system 100b. In this embodiment, a buoyancy module 120b includes only a permanent buoyancy chamber 122b, while an adjustable buoyancy chamber 124b has been moved to the carrier module, or to a fishing module 136b or a payload module 138b, detailed in FIGS. 12-13, respectively. This configuration allows fishing module 136b and payload module 138b to provide a desired/adjusted level of buoyancy while retaining a separate buoyancy module 120b having a permanent buoyancy that prevents the remainder of delivery system 100b from reaching the bottom of the water column.

Alternate delivery systems 100a and 100b have been described to demonstrate the flexible nature of the modular design of the delivery system described herein. Numerous additional embodiments beyond delivery systems 100, 100a, and 100b are possible. For example, mounting shaft 102 may be affixed to different or additional modules or may be connected loosely, rather than threadably attached to buoyancy module 120 via threaded hole 108 (FIG. 1), thereby allowing mounting shaft 102 to separate from the other modules when launched.

Additional modules may provide new features to the overall functionality of delivery system 100. For instance, a motorized module could sense nearby movement (i.e., fish movement) and provide a mechanism for moving the system to a more desirable location, either to avoid unfavorable conditions such as strong currents or to position the system closer to one or more fish. Another exemplary module could feature fish-attracting accessories that employ sound or light to attract fish to the system, rendering fish more likely to find and take the baited hook or artificial lure.

Figure 14:
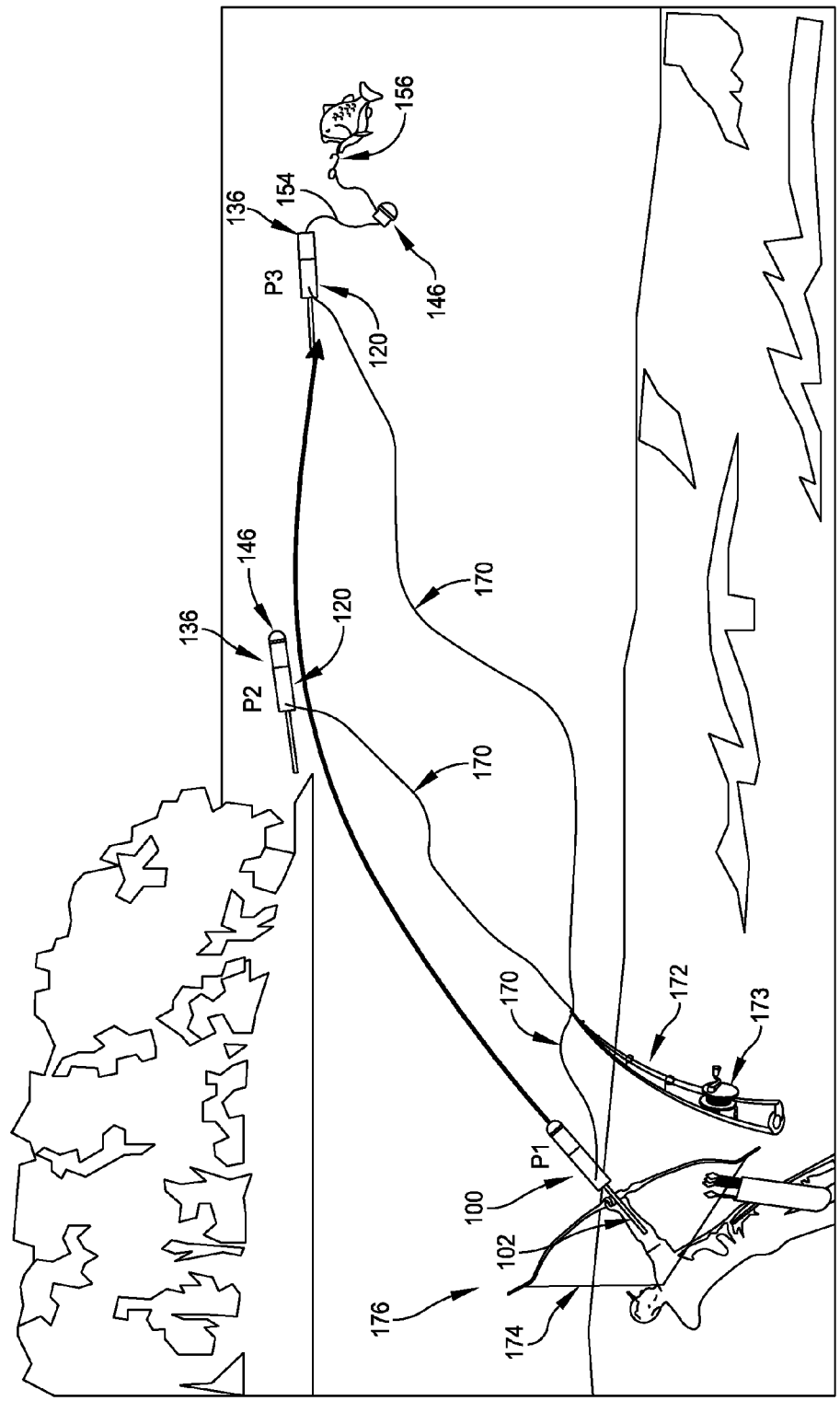
FIG. 14 provides a graphic depiction of a method of use for the delivery system of FIG. 1.

FIG. 14 graphically illustrates one embodiment of a method of operation for delivery system 100, 100a, or 100b. For ease of illustration, the method is discussed in relation to system 100. However, it should be understood that the method applies equally to alternate embodiments.

The method begins at position P1 with a delivery system 100 featuring fishing module 136. Delivery system 100 has been adjusted to provide a desired buoyancy and loaded with hook 156. To deploy delivery system 100, a user may attach (e.g., tie) a fishing line 170 from a fishing rod 172 and reel 173 to rod-line attachment portion 132 (FIGS. 1-3) of delivery system 100. Once fishing line 170 is attached to delivery system 100, the user may nock mounting shaft 102 on a bowstring 174 of a launching apparatus such as a bow 176. Using bow 176, the user may launch delivery device 100 toward a desired long-range location.

At position P2, delivery system 100 has reached the top of its trajectory such that the force of gravity begins to draw nose-cone assembly 146 from hollow body 140 and draw hook 156 from fishing module 136. Delivery system 100 impacts the water's surface at position P3, where nose-cone assembly 146 continues to draw hook 156 from fishing module 136 to make it available to fish in the area. Once a fish takes hook 156, the user may reel the fish in with fishing rod 172 and reel 173 in the traditional manner.

While the method discussed above features fishing module 136, the method applies equally to payload module 138. Moreover, while FIG. 14 shows the use of bow 176 as a launching apparatus, any appropriate launching device may be substituted. Alternate launching devices may include, but are not limited to, slingshots, catapults, and more.

While the modular design and corresponding method discussed above provide a significant amount of flexibility, a simpler embodiment of the delivery system may include a single tube that combines all of the modules, i.e., the buoyancy and fishing modules or the buoyancy and payload modules, mounted upon the mounting shaft. In another embodiment, the fishing and payload modules may be used as self-contained units, with or without the buoyancy module or one or both buoyancy chambers and without the mounting shaft. The resulting delivery system could be launched from a simple slingshot or other launching apparatus that does not require a nock or slot on a mounting shaft.

FIGS. 15-16 detail a throwable embodiment of a long-range fishing-device delivery system 100c. In this embodiment, either a fishing module 136c (FIG. 15) or payload module 138c (FIG. 16) may be embedded within an oblong buoyancy module 120c that is shaped to fit a human hand (e.g., approximating a football shape). Fishing module 136c and payload module 138c may mirror original fishing and payload modules 136 and 138, discussed above in relation to FIGS. 4-5, in both features and functionality, though either or both may be adjusted in size to accommodate the oblong buoyancy module 120c. As a result, system 100c may be thrown into the water without relying on any type of launching apparatus such as a bow, slingshot, or similar device.

In its various embodiments, the long-distance fishing-device delivery system described above provides a flexible set of modules that may be assembled and configured to support a wide variety of long-distance fishing scenarios and launching apparatus. The system allows a baited hook, artificial lure, or virtually any other type of fishing accessory to be launched from a bow, a slingshot, a similar launching apparatus, or even by hand into locations otherwise inaccessible with traditionally cast hooks and lures. Additionally, anglers may configure the system to present the selected fishing device at multiple depths along the water column. Employing the system described above gives anglers numerous new options to reach across a body of water to fish without the cost of owning or purchasing a boat.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A long-range fishing-device delivery system for use in connection with a launching apparatus and a fishing rod, said delivery system comprising:
   a mounting shaft having first and second ends;
   a rod-line attachment portion affixed at said first end of said mounting shaft;
   a buoyancy module affixed at said first end of said mounting shaft; and a carrier module affixed to said buoyancy module, wherein said second end of said mounting shaft is configured to receive a launch force from the launching apparatus, and wherein said rod-line attachment portion retains a fishing line from the fishing rod.

2. The delivery system of claim 1, wherein said carrier module comprises a fishing module.

3. The delivery system of claim 2, wherein said fishing module comprises:
   a nose cone detachably connected to a hollow body having an inner cylindrical wall;
   a spool rotatably connected across said inner cylindrical wall of said hollow body; and
   a fishing line having a spool end, a nose-cone end, and a hook, wherein said spool end is attached to said spool and said nose-cone end is attached to said nose cone such that when said nose cone detaches from said hollow body, said fishing line unwinds and pulls said hook from said hollow body.

4. The delivery system of claim 1, wherein said carrier module comprises a payload module.

5. The delivery system of claim 4, wherein said payload module comprises a nose cone affixed to a hollow body configured to house a payload.

6. The delivery system of claim 5, wherein said payload comprises one or more of a fish-finder transducer, a noise maker, a movement sensor, a depth sensor, and a temperature sensor.

7. The delivery system of claim 1, wherein said buoyancy module comprises one or both of a permanent buoyancy chamber and an adjustable buoyancy chamber.

8. The delivery system of claim 7, wherein said adjustable buoyancy chamber includes at least one sealable adjustment aperture.

9. The delivery system of claim 8, wherein a buoyancy of said adjustable buoyancy chamber is adjusted by adding weight to said adjustable buoyancy chamber via said adjustment aperture before sealing said adjustment aperture.

10. The delivery system of claim 8, wherein when said sealable adjustment aperture is open, said adjustment aperture takes on water upon landing and achieves a minimum buoyancy.

11. A method of using a launching apparatus and a fishing rod having a reel of rod line to deliver a fishing device to a desired long-range location, comprising:
    providing a long-range fishing-device delivery system having a mounting shaft with first and second ends, wherein said first end includes a rod-line attachment portion and a carrier module and said second end is configured to fit against a drawstring of said launching apparatus;
    loading said carrier module with said fishing device;
    attaching said rod line to said rod-line attachment portion of said delivery system; and
    using said launching apparatus, launching said delivery system toward said desired long-range location;
    wherein said delivery system further comprises one of a permanent buoyancy chamber and an adjustable buoyancy chamber.

12. The method of claim 11, further comprising adjusting a buoyancy of said adjustable buoyancy chamber prior to said launching of said delivery system.

13. The method of claim 12, wherein said adjusting said buoyancy comprises adding weight to said adjustable buoyancy chamber.

14. The method of claim 12, wherein said adjustable buoyancy chamber includes at least one adjustment aperture, and wherein said adjusting said buoyancy comprises sealing said adjustment aperture to achieve maximum buoyancy.

15. The method of claim 12, wherein said adjustable buoyancy chamber includes at least one adjustment aperture, and wherein said adjusting said buoyancy comprises opening said adjustment aperture to cause said buoyancy module to take on water and achieve minimum buoyancy.

16. The method of claim 11, wherein said carrier module comprises a fishing module configured to open on or before impact with a water surface, and wherein said fishing device comprises a hooked line.

17. The method of claim 11, wherein said carrier module comprises a payload module, and wherein said fishing device comprises one or more of a fish-finder transducer, a noise maker, a movement sensor, a depth sensor, and a temperature sensor.

18. The method of claim 11, further comprising retrieving said delivery system with said reel of said fishing rod.

* * * * *